US012692418B2

(12) United States Patent
Ito

(10) Patent No.: US 12,692,418 B2
(45) Date of Patent: Jul. 28, 2026

(54) THERMALLY CONDUCTIVE SILICONE ADHESIVE COMPOSITION AND A THERMALLY CONDUCTIVE COMPOSITE

(71) Applicant: Shin-Etsu Chemical Co., Ltd., Tokyo (JP)

(72) Inventor: Takanori Ito, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 294 days.

(21) Appl. No.: 18/710,926

(22) PCT Filed: Oct. 21, 2022

(86) PCT No.: PCT/JP2022/039251

§ 371 (c)(1),
(2) Date: May 16, 2024

(87) PCT Pub. No.: WO2023/090049

PCT Pub. Date: May 25, 2023

(65) Prior Publication Data

US 2025/0034437 A1 Jan. 30, 2025

(30) Foreign Application Priority Data

Nov. 18, 2021 (JP) ................................ 2021-187776

(51) Int. Cl.

| | |
|---|---|
| ***C09J 7/38*** | (2018.01) |
| ***B32B 5/02*** | (2006.01) |
| ***B32B 7/12*** | (2006.01) |
| ***B32B 27/28*** | (2006.01) |
| ***C09J 7/21*** | (2018.01) |
| ***C09J 7/25*** | (2018.01) |
| ***C09J 7/40*** | (2018.01) |
| ***C09J 11/04*** | (2006.01) |
| ***C09K 5/14*** | (2006.01) |

(52) U.S. Cl.

CPC .................. *C09J 7/38* (2018.01); *B32B 5/02* (2013.01); *B32B 7/12* (2013.01); *B32B 27/281* (2013.01); *C09J 7/21* (2018.01); *C09J 7/25* (2018.01); *C09J 7/401* (2018.01); *C09J 7/405* (2018.01); *C09J 11/04* (2013.01); *C09K 5/14* (2013.01); *B32B 2255/02* (2013.01); *B32B 2255/10* (2013.01); *B32B 2255/26* (2013.01); *B32B 2262/101* (2013.01); *B32B 2307/206* (2013.01); *B32B 2307/302* (2013.01); *B32B 2307/54* (2013.01); *B32B 2405/00* (2013.01); *B32B 2457/00* (2013.01); *C09J 2301/408* (2020.08)

(58) Field of Classification Search

CPC ......... C09J 7/38; C09J 7/21; C09J 7/22; C09J 7/25; C09J 7/29; C09J 7/30; C09J 7/401; C09J 7/405; C09J 11/04; C09J 11/06; C09J 183/04; C09J 2301/408; C09J 2203/326; C09J 2301/124; C09J 2301/312; C09J 2400/143; C09J 2483/00; B32B 5/02; B32B 7/027; B32B 7/12; B32B 27/00; B32B 27/08; B32B 27/12; B32B 27/281; B32B 27/283; B32B 27/34; B32B 27/36; B32B 2255/02; B32B 2255/10; B32B 2255/26; B32B 2262/101; B32B 2307/206; B32B 2307/302; B32B 2307/54; B32B 2307/7376; B32B 2307/748; B32B 2405/00; B32B 2457/00; C09K 5/14; C08G 77/12; C08G 77/20; C08K 2003/2227; C08K 2003/282

See application file for complete search history.

(56) References Cited

U.S. PATENT DOCUMENTS

| | | | | |
|---|---|---|---|---|
| 12,404,405 | B2 * | 9/2025 | Ito | .......................... C08L 83/04 |
| 2008/0254247 | A1 | 10/2008 | Asaine | |
| 2015/0299531 | A1 | 10/2015 | Tojo et al. | |
| 2017/0130108 | A1 | 5/2017 | Bradford et al. | |
| 2018/0192547 | A1 | 7/2018 | Nishio et al. | |

(Continued)

FOREIGN PATENT DOCUMENTS

| | | | |
|---|---|---|---|
| EP | 3960829 | A1 | 3/2022 |
| JP | 2002121529 | A | 4/2002 |

(Continued)

OTHER PUBLICATIONS

Extended European Search Report corresponding to European Patent Application No. 22895335.2 (6 pages) (dated Nov. 10, 2025).

(Continued)

*Primary Examiner* — Scott R. Walshon
(74) *Attorney, Agent, or Firm* — Myers Bigel, P.A.

(57) ABSTRACT

The present invention aims to provide a thermally conductive silicone adhesive composition that provides excellent handling and sufficient adhesive strength. Additionally, the present invention aims to provide a composite with excellent strength and insulation.

Described herein is a thermally conductive silicone adhesive composition, comprising the following components (a) to (e):

(a) 100 parts by mass of a linear or branched organopolysiloxane;
(b) 1,500 to 7,500 parts by mass of a thermally conductive filler;
(c) 150 to 600 parts by mass of an organopolysiloxane resin with three-dimensional network structure, comprising the following components (c-1) and (c-2) each as described herein;
(d) 1 to 25 parts by mass of an organohydrogenpolysiloxane having two or more hydrosilyl groups in one molecule; and
(e) 5 to 50 parts by mass of an organic peroxide.

20 Claims, No Drawings

(56) References Cited

U.S. PATENT DOCUMENTS

| | | | |
|---|---|---|---|
| 2020/0354526 | A1 | 11/2020 | Ito et al. |
| 2021/0079221 | A1 | 3/2021 | Toya et al. |
| 2021/0292607 | A1 | 9/2021 | Itoh et al. |
| 2022/0220311 | A1 | 7/2022 | Ito et al. |

FOREIGN PATENT DOCUMENTS

| | | | |
|---|---|---|---|
| JP | 2004233455 | A | 8/2004 |
| JP | 2008260798 | A | 10/2008 |
| JP | 2010202728 | A | 9/2010 |
| JP | 2014034652 | A | 2/2014 |
| JP | 2014062220 | A | 4/2014 |
| JP | 2017088853 | A | 5/2017 |
| JP | 2020180186 | A | 11/2020 |
| WO | 2019142688 | A1 | 7/2019 |
| WO | 2020032287 | A1 | 2/2020 |

OTHER PUBLICATIONS

English translation of International Search Report corresponding to International Patent Application No. PCT/JP2022/039251 (2 pages) (mailed Jan. 10, 2023).

* cited by examiner

THERMALLY CONDUCTIVE SILICONE ADHESIVE COMPOSITION AND A THERMALLY CONDUCTIVE COMPOSITE

TECHNICAL FIELD

The present invention relates to a thermally conductive silicone adhesive composition and a thermally conductive composite.

BACKGROUND OF THE INVENTION

With higher performance, higher speed, smaller size, and higher integration, transistors used in electronic devices and semiconductors like LED elements for light sources such as lighting are now emitting large amounts of heat themselves. Temperature increases in devices due to this emitted heat cause malfunctions or the destruction of the devices. Thus, to suppress temperature increases in semiconductors in operation, a variety of heat diffusion methods and heat diffusion members therefor have been suggested.

Conventionally, thermally conductive materials have been used in electronic devices and the like as intermediaries to transfer the heat to a cooling member such as a heat sink or housing made of a metal sheet with high heat conductivity to thereby release heat from a semiconductor into the external environment. As a thermally conductive material, a thermally conductive sheet with insulation is often used. To fix the cooling member and the semiconductor, screws and clips are used, and the thermally conductive sheet therebetween is also fixed via pressing by screws and clips. However, the methods fixing with screws and clips require a various of components and processes, extremely worsening the manufacturing efficiency. Furthermore, components such as screws and clips prevent the downsizing and thinning of the electronic device itself and are extremely disadvantageous in terms of product design.

Accordingly, a method to impart stickiness to a thermally conductive sheet arranged between a cooling member and a semiconductor and thereby fix a housing and a semiconductor element. Specifically, this method entails applying a sticking agent on both sides of a thermally conductive sheet to provide a thermally conductive sheet with the sticking agent. However, since the sticking agent to be used lacks heat conductivity itself, the heat transfer through the thermally conductive sheet with the sticking agent significantly worsens. Accordingly, for example, in Patent Literatures 1, 2, and 3, thermally conductive sticking tapes that use thermally conductive fillers in sticking materials are described. Further, Patent Literature 4 describes a thermally conductive silicone sticking tape that comprises silicone as a polymer due to its heat resistance, cold resistance, and durability.

However, conventional sticking tapes have poor adhesive strength compared to common adhesive materials and there is a problem for omitting screws from fixing a thermally conductive sheet. Moreover, single-layer sticking tapes have room for improvement in terms of workability, insulation, and strength. Meanwhile, adhesive tapes are characterized by their ability to obtain better adhesive strength through thermocompression bonding than sticking tapes. However, a heating process with high pressure is required to obtain generally sufficient adhesive strength and, therefore, it sometimes may not be usable for heat diffusion members that are fragile under pressure.

Alternatively, some types of non-sheet thermal curing adhesives are highly adhesive to the heat diffusion member and a product with high adhesive strength and heat diffusion performance can be obtained. However, there are problems such as complexity in the application process and inferiority in workability and reworkability compared to sticking (adhesive) sheets, as well as risks of mixing in bubbles. Further, cold storage is often recommended for the additional curing adhesive to suppress the deterioration of adhesive strength over time, leaving room for improvement since it increases process management needs for users.

PRIOR LITERATURES

Patent Literatures

Patent Literature 1: Japanese Patent Application Laid-Open No. 2014-34652

Patent Literature 2: Japanese Patent Application Laid-Open No. 2014-62220

Patent Literature 3: Japanese Patent Application Laid-Open No. 2002-121529

Patent Literature 4: Japanese Patent Application Laid-Open No. 2008-260798

DISCLOSURE OF THE INVENTION

Problems to be Solved by the Invention

Therefore, the present invention aims to provide a thermally conductive silicone adhesive composition that provides excellent handling and sufficient adhesive strength. Additionally, the present invention aims to provide a composite with excellent strength and insulation.

Solutions to the Problems

The present inventor conducted extensive research to achieve the objectives and has found an adhesive layer with excellent handling and adhesive strength to the heat diffusion member by specifying the composition of the silicone resin and the amount of the thermally conductive fillers contained in the thermally conductive silicone adhesive composition, thus resulting in the present invention.

That is, the present invention provides a thermally conductive silicone adhesive composition, comprising the following components (a) to (e):

(a) 100 parts by mass of a linear or branched organopolysiloxane;

(b) 1,500 to 7,500 parts by mass of a thermally conductive filler;

(c) 150 to 600 parts by mass of an organopolysiloxane resin with three-dimensional network structure, comprising the following components (c-1) and (c-2);

(c-1) an organopolysiloxane resin with three-dimensional network structure, represented by the following general formula (1):

$$(R^1_3SiO_{1/2})_{a1}(R^1R^2SiO_{2/2})_{b1}(R^1_2SiO_{2/2})_{c1}(R^1SiO_{3/2})_{d1}(SiO_{4/2})_{e1} \quad (1)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, $R^2$ is an alkenyl group having 2 to 8 carbon atoms, and a1, b1, c1, d1 and e1 are numbers each satisfying equations 0<a1<=100, 0<b1<=100, 0<=c1<=100, 0<=d1<=100, 0<=e1<=100, 0<d1+e1, and 0.5<=a1/(d1+e1)<=2, wherein an amount of alkenyl groups in the molecule is 0.05 to 0.15 mol/100 g;

(c-2) an organopolysiloxane with three-dimensional network structure resin, represented by the following general formula (2):

$$(R^1_3SiO_{1/2})_{a2}(R^1_2SiO_{2/2})_{c2}(R^1SiO_{3/2})_{d2}(SiO_{4/2})_{e2} \quad (2)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, and a2, c2, d2 and e2 are numbers each satisfying equations 0<a2<=100, 0<=c2<=100, 0<=d2<=100, 0<e2<=100, and 0.7<=a2/e2<=2.5;

(d) 1 to 25 parts by mass of an organohydrogenpolysiloxane having two or more hydrosilyl groups in one molecule; and (e) 5 to 50 parts by mass of an organic peroxide.

The present invention further provides the thermally conductive silicone adhesive composition, further comprising 1 to 50 parts by mass of (f) one or more components selected from the following components (f-1) and (f-2):

(f-1) an alkoxysilane compound represented by the following general formula (3):

$$R^3_mR^4_nSi(OR^5)_{4-m-n} \quad (3)$$

wherein $R^3$ is, independently of each other, an alkyl group having 6 to 15 carbon atoms, $R^4$ is, independently of each other, an alkyl group having 1 to 5 carbon atoms, $R^5$ is, independently of each other, an alkyl group having 1 to 6 carbon atoms, m is an integer of 1 to 3, and n is an integer of 0 to 2, provided that m+n is an integer of 1 to 3;

(f-2) a dimethylpolysiloxane represented by the following general formula (4):

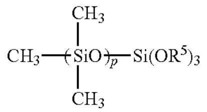

(4)

wherein $R^5$ is, independently of each other, an alkyl group having 1 to 6 carbon atoms, and p is an integer of 5 to 100.

Further, the present invention provides a thermally conductive composite obtained by forming the thermally conductive silicone adhesive composition comprising the components (a) to (e) into a sheet-like shape and laminating it onto a reinforcement layer.

Effects of the Invention

The thermally conductive silicone adhesive composition of the present invention has excellent handling and is easily mounted onto the heat diffusion member. Furthermore, the thermally conductive silicone adhesive composition imparts desirable heat conductivity between the heat emitting element and the heat diffusion member, and by expressing excellent adhesive strength, the members is firmly fixed together. Further, the thermally conductive silicone adhesive composition does not require a curing process at a high pressure for thermocompression bonding (joining) with the heat diffusion member. Instead, the thermally conductive silicone adhesive composition is cured by leaving it at a high temperature for a predetermined time and a cured product with sufficient adhesive strength is obtained and, thereby, allowing the thermally conductive silicone adhesive composition of the present invention to be used to join a wide range of heat diffusion members.

Further, the thermally conductive composite obtained by laminating the thermally conductive adhesive layer consisting of the thermally conductive silicone adhesive composition onto both sides of the reinforcement layer allows for increased strength and insulation.

As a result, the thermally conductive silicone adhesive composition of the present invention is extremely effective as a thermally conductive member arranged between a heat emitting element and a heat diffusion member, transferring the heat from the heat emitting element to the heat diffusion member, as well as securing both of them.

DETAILED DESCRIPTION OF THE INVENTION

Hereinafter, the present invention is described in detail.

The thermally conductive silicone adhesive composition of the present invention is characterized by comprising the components (a) to (e). Each of these components is explained in detail below.

(a) Organopolysiloxane

Component (a) is a linear or branched organopolysiloxane, preferably the organopolysiloxane represented by the following average composition formula (5):

$$R_xSiO_{(4-x)/2} \quad (5)$$

wherein R is, independently of each other, a monovalent hydrocarbon group having 1 to 10 carbon atoms, and x is a positive number of 1.98 to 2.02.

In the aforesaid formula, R is, independently of each other, a monovalent hydrocarbon group having 1 to 10 carbon atoms, or preferably a monovalent hydrocarbon group having 1 to 8 carbon atoms. Examples of the monovalent hydrocarbon groups include alkyl groups such as a methyl group, ethyl group, propyl group, and butyl group; cycloalkyl groups such as a cyclohexyl group; alkenyl groups such as a vinyl group, allyl group, butenyl group, and hexenyl group; aryl groups such as a phenyl group and tolyl group; and the like. Among these, a methyl group, vinyl group, or phenyl group is preferable.

The organopolysiloxane (a) may or may not have alkenyl groups in the molecule. If no alkenyl groups are present, preferably 50 mol % or more of the total number of substituents R in the organopolysiloxane represented by formula (5) are methyl groups, more preferably 80 mol % or more are methyl groups, or particularly preferably all the substituents R is a methyl group.

When the organopolysiloxane (a) has alkenyl groups, an amount of alkenyl groups in the molecule is 2 or more, more preferably 2 to 20, or even more preferably 2 to 10. Regarding the substituents R other than alkenyl groups, preferably 50 mol % or more of the total number of substituents R in the organopolysiloxane of formula (5) are methyl groups, or particularly preferably 80 mol % or more are methyl groups.

While the organopolysiloxane (a) is preferably linear, it may have branches to some degree, as long as they do not impair the rubber strength as a thermally conductive adhesive. Also, it may be a mixture of two or more organopolysiloxanes differing in molecular structure and degree of polymerization. The organopolysiloxane (a) has preferably an average degree of polymerization of preferably 100 to 20,000, particularly 200 to 10,000. The average degree of polymerization may be determined by gel permeation chromatography (GPC) as the polystyrene equivalent number average degree of polymerization. Examples of the organopolysiloxane (a) include diorganopolysiloxane raw rubbers having an average degree of polymerization of preferably 3,000 to 20,000, preferably 5,000 to 15,000, and diorganopolysiloxane oils having an average degree of polymerization of 100 to 1,500 or preferably 300 to 1,000. The latter is preferably a diorganopolysiloxane oil having alkenyl groups at both ends of the molecule.

(b) Thermally Conductive Filler

The thermally conductive filler (b) may be any known filler generally contained in a thermally conductive silicone composition and is preferably one or more selected from the group consisting of metals, metal oxides, and metal nitrides. Any known thermally conductive filler may be used. Examples of thermally conductive filler include metals such as non-magnetic copper and aluminum; metal oxides such as alumina, silica, magnesia, red iron oxide, beryllia, titania, and zirconia; metal nitrides such as aluminum nitride, silicon nitride, and boron nitride; artificial diamonds or silicon carbide; and the like. The thermally conductive filler has an average particle size of 0.1 to 50 μm, preferably 0.5 to 45 μm, more preferably 0.8 to 40 μm, or even more preferably 1 to 30 μm. The thermally conductive filler may be used alone or in a combination of two or more types. Two or more types of particles differing in average particle size may be used. In the present invention, the term "average particle size" means the volume average particle size as a value measured using a Microtrac particle size analyzer MT3300EX (Nikkiso Co., Ltd.).

The thermally conductive filler may be subjected to various known surface treatments, as long as the effects of the present invention such as heat conductivity are not significantly impaired. Examples of these surface treatments include coupling agent treatments such as silane-based and titanate-based treatments; plasma treatments; and the like.

The amount of the thermally conductive filler is characterized by being 1,500 to 7,500 parts by mass or preferably 2,000 to 6,500 parts by mass, relative to 100 parts by mass of component (a). Excessive amounts of the thermally conductive filler embrittle the tape and, thereby, the workability lowers. Conversely, insufficient amounts cannot impart the desired heat conductivity.

(c) Organopolysiloxane Resin with Three-Dimensional Network Structure

The three-dimensional network silicone resin (c) serves to express cohesiveness in the tape, impart workability, and impart excellent adhesive strength onto the adhesive layer after curing. Component (c) is the organopolysiloxane resin with three-dimensional network structure, comprising the following components (c-1) and (c-2):

(c-1) an organopolysiloxane resin with three-dimensional network structure, represented by the following general formula (1):

$$(R^1{}_3SiO_{1/2})_{a1}(R^1R^2SiO_{2/2})_{b1}(R^1{}_2SiO_{2/2})_{c1}(R^1SiO_{3/2})_{d1}(SiO_{4/2})_{e1} \quad (1)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, $R^2$ is an alkenyl group having 2 to 8 carbon atoms, and a1, b1, c1, d1, and e1 are numbers satisfying equations $0<a1<=100$, $0<b1<=100$, $0<=c1<=100$, $0<=d1<=100$, $0<=e1<=100$, $0<d1+e1$, and $0.5<=a1/(d1+e1)<=2.0$, wherein the amount of alkenyl groups in the molecule is 0.05 to 0.15 mol/100 g;

(c-2) an organopolysiloxane resin with three-dimensional network structure, represented by the following general formula (2):

$$(R^1{}_3SiO_{1/2})_{a2}(R^1{}_2SiO_{2/2})_{c2}(R^1SiO_{3/2})_{d2}(SiO_{4/2})_{e2} \quad (2)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, and a2, c2, d2, and e2 are numbers satisfying equations $0<a2<=100$, $0<=c2<=100$, $0<=d2<=100$, $0<e2<=100$, and $0.7<=a2/e2<=2.5$.

Component (c-1)

Component (c-1) is the organopolysiloxane resin with three-dimensional network structure, represented by general formula (1), having an amount of alkenyl groups in the molecule of 0.05 to 0.15 mol/100 g. Component (c-1) is characterized by having an amount of alkenyl groups in the molecule of 0.05 to 0.15 mol/100 g, preferably 0.06 to 0.14 mol/100 g, further preferably 0.07 to 0.12 mol/100 g. An amount of alkenyl groups in the molecule of less than 0.05 mol/100 g is not preferable due to difficulties in imparting sufficient adhesive strength. Conversely, an amount of alkenyl groups in the molecule of more than 0.15 mol/100 g is also not preferable due to the embrittlement of the tape and reduction in workability.

In formula (1), $R^1$ is, independently of each other, a group selected from the group consisting of alkyl groups having 1 to 10 carbon atoms, aryl groups having 6 to 10 carbon atoms, and aralkyl groups having 7 to 10 carbon atoms. Examples of these groups include alkyl groups such as a methyl group, ethyl group, propyl group, butyl group, pentyl group, hexyl group, cyclohexyl group, and heptyl group; aryl groups such as a phenyl group, tolyl group, xylyl group, and naphthyl group; aralkyl groups such as a benzyl group and phenethyl group; and the like. Among these, a methyl group or vinyl group is particularly preferable.

In formula (1), $R^2$ is, independently of each other, an alkenyl group having 2 to 8 carbon atoms. Examples of these groups include a vinyl group, allyl group, butenyl group, pentenyl group, hexenyl group, cyclohexenyl group, heptenyl group, and the like. Among these, a vinyl group is particularly preferable.

In the formula, a1, b1, c1, d1, and e1 are numbers satisfying equations 0<a1<=100, 0<b1<=100, 0<=c1<=100, 0<=d1<=100, 0<=e1<=100, 0<d1+e1, and 0.5<=a1/(d1+e1)<=2, or preferably, 1<=a1<=50, 1<=b1 50, 0<=c1<=50, 0<=d1<=50, and 1<=e1<=50. Component (c-1) has at least one type of branched-chain siloxane unit selected from a trifunctional $R^1SiO_{3/2}$ unit (T unit) and a tetrafunctional $SiO_{4/2}$ unit (Q unit). The ratio (a1/(d1+e1)) of the number (a1) of $R^1{}_3SiO_{1/2}$ units (M units) to the total of the number (d1) of $R^1SiO_{3/2}$ units (T units) and the number (e1) of $SiO_{4/2}$ units (Q units) satisfies 0.5<=a1/(d1+e1)<=2, preferably 0.6<=a1/(d1+e1)<=1.8, further preferably 0.7<=a1/(d1+e1)<=1.5.

If the ratio is less than 0.5, it is difficult to highly fill the thermally conductive filler (b) and the heat conductivity of the tape lowers. Conversely, if the ratio is more than 2, the cohesiveness of the tape and the workability lowers.

Component (c-2)

Component (c-2) is the organopolysiloxane resin with three-dimensional network structure, represented by general formula (2), having no alkenyl groups.

In formula (2), $R^1$ is, independently of each other, a group selected from the group consisting of alkyl groups having 1 to 10 carbon atoms, aryl groups having 6 to 10 carbon atoms, and aralkyl groups having 7 to 10 carbon atoms. Examples of these groups include alkyl groups such as a methyl group, ethyl group, propyl group, butyl group, pentyl group, hexyl group, cyclohexyl group, and heptyl group; aryl groups such as a phenyl group, tolyl group, xylyl group, and naphthyl group; aralkyl groups such as a benzyl group and phenethyl group; and the like. Among these, a methyl group or vinyl group is particularly preferable.

In formula (2), a2, c2, d2, and e2 are numbers satisfying equations 0<a2<=100, 0<=c2<=100, 0<=d2<=100, 0<e2<=100, and 0.7<=a2/e2<=2.5, or preferably 1<=a2<=50, 0<=c2<=50, 0<=d2<=50, and 1<=e2<=50. The ratio (a2/e2) of the number of $R^1{}_3SiO_{1/2}$ units (M units) (a2) to the number of $SiO_{4/2}$ units (Q units) (e2) satisfies 0.7<=a2/e2<=2.5, preferably 0.8<=a2/e2<=2.2, further preferably 0.9<=a2/e2<=2.

If the ratio (a2/e2) is less than the aforementioned lower limit, it is difficult to highly fill the thermally conductive filler (b) and the heat conductivity of the tape lowers. Conversely, if the ratio (a2/e2) is more than the aforementioned upper limit, the cohesiveness of the tape lowers and the desired adhesive strength cannot be obtained.

As long as $R^1$ is not required to have special properties such as solvent resistance, it is most preferable for each $R^1$ to be a methyl group, for reasons such as its cost, accessibility, chemical stability, environmental impact, and the like.

As a solid, the organopolysiloxane resin with three-dimensional network structure (c) may be used as a toluene solution of 50 to 70 mass %. In this case, the kinetic viscosity of the solution has only to be 10 to 500 $mm^2/s$ or preferably 100 to 250 $mm^2/s$. The kinetic viscosity is a value determined at 25° C. using a Cannon-Fenske Viscometer according to JIS Z8803:2011.

The value of a1/(d1+e1) for component (c-1) and the value of a2/e2 for component (c-2) may be determined by $^{29}Si$-NMR. The preparation of the $^{29}Si$-NMR sample is not limited. For example, measurements may be made by dissolving 1 part by mass of the organopolysiloxane resin into 3 parts by mass of deuterated chloroform.

Component (c) of the present invention is characterized by comprising a combination of the components (c-1) and (c-2). The combination ratio of component (c-1) to component (c-2) is preferably such that the amount of component (c-1) is 10 to 60 mass %, preferably 15 to 50 mass %, based on the total amount of component (c). When the proportion of component (c-1) in the composition is within the range, the resulting cured product is gotten excellent adhesive strength. The proportion of component (c-2) may be such that the amount of component (c-1) satisfies the aforementioned range, is preferably 40 to 90 mass %, even more preferably 50 to 85 mass %, based on the total amount of component (c).

The amount of component (c) in the composition is 150 to 600 parts by mass, preferably 200 to 550 parts by mass, even more preferably 250 to 500 parts by mass, relative to 100 parts by mass of component (a). If the amount of component (c) is less than the aforementioned lower limit, the desired adhesive strength to the thermally conductive adhesive layer cannot be imparted. Conversely, if the amount of component (c) is more than the aforementioned upper limit, obtained tape is brittleness and has poor flexibility and results in inadequate workability.

Component (c) is a solid or a viscous liquid at room temperature and may be used when dissolved into solvents. In this case, the amount of component (c) added to the composition has only to be adjusted such that the amount of the resin excluding solvents satisfies the aforementioned range.

(d) Organohydrogenpolysiloxane Having Two or More Hydrosilyl Groups in One Molecule Component (d) is an organohydrogenpolysiloxane having at least two hydrogen atoms bonded to a silicon atom (i.e. hydrosilyl group) in one molecule. Component (d) serves to express excellent wettability with the adherend interface and increase adhesive strength. The organohydrogenpolysiloxane may be a known compound, preferably one substantially having no hydroxyl groups bonded to a silicon atom (i.e. silanol group) in the molecule. The organohydrogenpolysiloxane may be used alone or in a combination of two or more types.

The organohydrogenpolysiloxane may be represented by the following average composition formula (6):

$$R^6{}_rH_sSiO_{(4-r-s)/2} \quad (6)$$

In formula (6), $R^6$ is, independently of each other, a monovalent hydrocarbon group having 1 to 10 carbon atoms, preferably having 1 to 8 carbon atoms, which has no aliphatic unsaturated bonds such as those in alkenyl groups. Examples of these monovalent hydrocarbon groups include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as a phenyl group, tolyl group, xylyl group, and naphthyl group; aralkyl groups such as a benzyl group, phenethyl group, and phenylpropyl group. Among these, an alkyl group or aryl group is preferable and a methyl group is more preferable. r is a positive number of 0.7 to 2.1, preferably a positive number of 1.0 to 2.0, s is a positive number of 0.001 to 1.0, preferably a positive number of 0.01 to 1.0, and r is is a number of 0.8 to 3.0, preferably a number of 1.5 to 2.5.

The organohydrogenpolysiloxane has 2 to 200, preferably 3 to 100, further preferably 4 to 50 hydrosilyl groups in one molecule. The hydrosilyl groups may be positioned one terminally or midchain in the molecule, or both. The molecular structure of the organohydrogenpolysiloxane may be any of linear, cyclic, branched-chain, or three-dimensional network structures. The number of silicon atoms in one molecule (degree of polymerization) is generally 2 to 300, preferably 3 to 150, further preferably 4 to 100. The degree of polymerization may be determined, for example, by gel permeation chromatography (GPC) analysis as the polystyrene equivalent number average degree of polymerization (number average molecular weight) using toluene as an eluent.

Examples of the organohydrogenpolysiloxane include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymer, methylhydrogenpolysiloxane capped with trimethylsiloxy groups at both ends of the molecule, dimethylsiloxane-methylhydrogensiloxane copolymer capped with trimethylsiloxy groups at both ends of the molecule, dimethylsiloxane-methylhydrogensiloxane-methylphenylsiloxane copolymer capped with trimethylsiloxy groups at both ends of the molecule, dimethylsiloxane-methylhydrogensiloxane-diphenylsiloxane copolymer capped with trimethylsiloxy groups at both ends of the molecule, methylhydrogenpolysiloxane capped with dimethylhydrogensiloxy groups at both ends of the molecule, dimethylpolysiloxane capped with dimethylhydrogensiloxy groups at both ends of the molecule, dimethylsiloxane-methylhydrogensiloxane copolymer capped with dimethylhydrogensiloxy groups at both ends of the molecule, dimethylsiloxane-methylphenylsiloxane copolymer capped with dimethylhydrogensiloxy groups at both ends of the molecule, dimethylsiloxane-diphenylsiloxane copolymer capped with dimethylhydrogensiloxy groups at both ends of the molecule, methylphenylpolysiloxane capped with dimethylhydrogensiloxy groups at both ends of the molecule, and diphenylpolysiloxane capped with dimethylhydrogensiloxy groups at both ends of the molecule, and those methyl groups in each of the compounds are partially or completely replaced by other alkyl groups such as ethyl groups, propyl groups, and the like. Examples of the organohydrogenpolysiloxane further include organosiloxane copolymers such as those consisting of siloxane units of the formula $R^2_3SiO_{1/2}$, siloxane units of the formula $R^2_2HSiO_{1/2}$, and siloxane units of the formula $SiO_{4/2}$; those consisting of siloxane units of the formula $R^2_2HSiO_{1/2}$ and siloxane units of the formula $SiO_{4/2}$; and those consisting of siloxane units of the formula $R^2HSiO_{2/2}$ and siloxane units of the formula $R^2SiO_{3/2}$ or $HSiO_{3/2}$, wherein $R^2$ is a monovalent hydrocarbon group other than an alkenyl group and is the groups defined for $R^1$. Two or more of these organohydrogenpolysiloxanes may be used in combination.

The amount of component (d) is 1 to 25 parts by mass or preferably 5 to 20 parts by mass, relative to 100 parts by mass of component (a). If the amount of component (d) is less than the lower limit, the wettability with the adherends is lowered and, thereby, adhesive strength is decreased. Conversely, if the amount is more than the upper limit, adhesive strength is decreased due to the embrittlement of the adhesive layer.

(e) Organic Peroxide

Component (e) is an organic peroxide which decomposes and produces free radicals under specific conditions, serving to promote the curing of the thermally conductive adhesive layer at high temperatures and increase adhesive strength. The organic peroxide may be a conventionally known organic peroxide and is not particularly limited. It may be used alone or in a combination of two or more types. Examples of these organic peroxides include peroxyketals such as 1,1-di(t-butylperoxy)cyclohexane and 2,2-di(4,4-d1-(t-butylperoxy)cyclohexyl)propane; hydroperoxides such as p-menthane hydroperoxide and diisopropylbenzene hydroperoxide; dialkyl peroxides such as dicumyl peroxide and t-butyl cumyl peroxide; diacyl peroxides such as dibenzoyl peroxide and disuccinic acid peroxide; peroxyesters such as t-butyl peroxyacetate and t-butyl peroxybenzoate; and peroxydicarbonates such as diisopropyl peroxydicarbonate. Particularly, peroxyketals, hydroperoxides, dialkyl peroxides, or peroxyesters with relatively high decomposition temperatures is preferable in view of handling and storability. These organic peroxides may be optionally diluted in organic solvents, hydrocarbons, liquid paraffin, inert solids, or the like.

The amount of component (e) is 5 to 50 parts by mass, preferably 10 to 45 parts by mass, relative to 100 parts by mass of component (a). If the amount of component (e) is less than the aforementioned lower limit, it results in insufficient curing of the thermally conductive adhesive layer in a curing process after securing to the heat diffusion member and, thereby, adhesive strength lowers. Conversely, if the amount is more than the aforementioned upper limit, it results in decomposition residue having a large effect in a similar curing process and, thereby, adhesive strength lowers.

(f) Surface Treatment Agent

The silicone composition preferably further contains a surface treatment agent (f). Component (f) serves to evenly disperse the thermally conductive filler (b) throughout a matrix composed of the organopolysiloxane (a) when preparing the composition. Component (f) is one or more selected from alkoxysilane compounds, represented by the following component (f-1) or dimethylpolysiloxanes having a trialkoxy group at one terminal of the molecule, represented by the following component (f-2). That is, component (f-1) and component (f-2) may be used alone or in combination.

(f-1) An alkoxysilane compound represented by the following general formula (3):

$$R^3_mR^4_nSi(OR^5)_{4-m-n} \quad (3)$$

wherein $R^3$ is, independently of each other, an alkyl group having 6 to 15 carbon atoms, $R^4$ is, independently of each other, an alkyl group having 1 to 5 carbon atoms, $R^5$ is, independently of each other, an alkyl group having 1 to 6 carbon atoms, m is an integer of 1 to 3, and n is an integer of 0 to 2, provided that m+n is an integer of 1 to 3.

(f-2) A dimethylpolysiloxane represented by the following general formula (4):

(4)

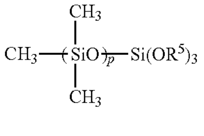

wherein $R^5$ is, independently of each other, an alkyl group having 1 to 6 carbon atoms, and p is an integer of 5 to 100.

In general formula (3), examples of the alkyl groups represented as $R^3$ include a hexyl group, octyl group, nonyl group, decyl group, dodecyl group, tetradecyl group, and the like. If the alkyl groups represented as $R^3$ have 6 to 15 carbon atoms, component (b) has sufficiently improved wettability, resulting in good handling and excellent properties for the composition.

$R^4$ is an alkyl group having 1 to 5 carbon atoms, preferably an alkyl group having 1 to 3 carbon atoms, or particularly preferably a methyl group.

$R^5$ is an alkyl group having 1 to 6 carbon atoms, preferably an alkyl group having 1 to 4 carbon atoms. Examples of these groups include a methyl group, ethyl group, propyl group, butyl group, and the like. A methyl group is more preferable.

The amount of component (f) is preferably 1 to 50 parts by mass, more preferably 5 to 40 parts by mass, even more preferably 10 to 35 parts by mass, relative to 100 parts by mass of component (a). If the amount of component (f) is less than the aforementioned lower limit, it is difficult to highly fill component (a) with component (b). Conversely, if the amount is more than the aforementioned upper limit, adhesive strength significantly decreases when added to the thermally conductive adhesive layer.

In addition to components (a) to (f), pigments and dyes for coloring, flame retardants, and various other additives for improving functionality may be added to the thermally conductive silicone adhesive composition, as long as the objectives of the present invention are not impaired.

The thermally conductive silicone adhesive composition is prepared by evenly mixing the components (a) to (e) and the optional component (f), as well as other components. The mixing method may be according to a conventionally known method. The components (d) and (e) are preferably mixed after the components (a), (b) and (c), and the optional component (f) are mixed.

The thermally conductive silicone adhesive composition may be applied on a substrate discussed below in the form of a thin film tape, formed and dried to obtain the thermally conductive adhesive layer for the thermally conductive composite of the present invention. The drying condition is a drying time of 5 to 20 minutes at a temperature of 60 to 100° C., or preferably 5 to 15 minutes at 70 to 90° C. If the drying condition is outside of the aforementioned range, heat conductivity lowers due to solvent residues, or the curing reaction of the composition is excessively promoted, and it is difficult for the dried thermally conductive adhesive layer to adhere to the heat diffusion member. The thermally conductive adhesive layer of the present invention is an uncured thermally conductive silicone adhesive composition, which, when mounted between the heat diffusion member and the heat emitting member and subjected to a thermal curing process, allows both of them to be firmly joined.

The thickness of the thermally conductive adhesive layer of the present invention is preferably 50 to 300 μm, preferably 75 to 250 μm. If the thickness of the adhesive layer is less than 50 μm, it results in worse handling for the tape and lowers adhesive strength. Conversely, if the thickness of the adhesive layer is more than 300 μm, it is difficult to impart the desired heat conductivity. When applying and forming the composition, solvents such as toluene, xylene, and the like may be added to adjust the viscosity of the composition.

The thermally conductive adhesive layer may be single-layered or laminated with two or more layers. Particularly, when the adhesive layer is made thick, for example, thicker than 250 μm, the adhesive composition is thickly applied at one time, the thickness of the adhesive layer easily becomes uneven, and defects such as the breakage of a separator film discussed below easily arise when applying and forming the adhesive composition. For this reason, the adhesive layer is preferably laminated with two or more layers, obtained by thinly applying and layering the adhesive composition multiple times. When laminating with two or more layers, the thermally conductive silicone adhesive composition of each layer may be the same or different.

The thermally conductive adhesive layer of the present invention may have a substrate surface-treated with a release agent as a separator film. In other words, both sides of the thermally conductive adhesive layer may be protected with films treated with release agents. Attaching a separator film onto the adhesive layer makes handling easier, such as for transportation, standard length cutting, and the like. In this case, the peel strength of the separator film may be adjusted by changing the amount or type of release agent used for treatment and the material properties of the film.

The separator film is preferably a polyethylene laminated paper or a PET film which has been surface-treated with a release agent using a cured film of a fluorine-modified silicone having fluorine-containing substituent bonded to the main chain, such as perfluoroalkyl or perfluoropolyether groups. The perfluoropolyether groups may be represented by the following formulas (7) to (9).

$$F(\underset{CF_3}{CF}CF_2O)_k\underset{CF_3}{CF}CF_2OCH_2CH_2CH_2— \quad (7)$$

$$F(\underset{CF_3}{CF}CF_2O)_k\underset{CF_3}{CF}CH_2OCH_2CH_2CH_2— \quad (8)$$

$$C_qF_{2q+1}CH_2OCH_2CH_2CH_2— \quad (9)$$

wherein k is 1 to 5 and q is 3 to 10.

Examples of commercially available fluorine-modified silicones include X-70-201, X-70-258, and X-41-3035 manufactured by Shin-Etsu Chemical Co., Ltd. While examples of substrate coating methods include the application of the liquid material onto the substrate using bar coaters, knife coaters, comma coaters, or spin coaters, and the like, it is not limited to the aforementioned methods.

The thermally conductive adhesive layer of the present invention is easily configured to the desired location, even as a thin tape or sheet, and expresses excellent heat conductivity. Further, by having the separator films discussed above, the thermally conductive adhesive layer of the present invention may be arranged between the cooling member and the heat emitting electrical component or the heat diffusion member by peeling a separator film on one side of the adhesive layer, attaching the now exposed adhesive layer to the heat emitting electrical component or the heat diffusion member, followed by peeling the remaining separator film and attaching the now exposed adhesive layer to the cooling member.

Further, the heat from the heat emitting element or the heat treatments after mounting the adhesive layer results in excellent adhesiveness between the members, thereby allowing the members to be firmly fixed. The heat treatment after mounting is performed with a heating time of 20 to 90 minutes at a temperature of 130 to 190° C., or preferably 30 to 60 minutes at 150 to 170° C., and pressurization during the heat treatment is not particularly required.

Further, in the thermally conductive composite of the present invention, the aforementioned thermally conductive adhesive layer is laminated onto a reinforcement layer described below to increase both strength and insulation. The reinforcement layer of the present invention preferably consists of a glass cloth or a synthetic resin. A synthetic resin film layer with excellent heat resistance and electrical insulation as well as flexibility and high mechanical strength is preferable, and may be selected from known substrates as appropriate.

The glass cloth preferably has a thickness of 10 to 50 μm and an area density of 45 $g/m^2$ or less, further preferably a thickness of 20 to 40 μm and an area density of 30 $g/m^2$ or less. The glass cloth is preferably thinner in consideration of the relatively low heat conductivity thereof. However, an excessively thin cloth lowers strength and cannot impart the desired reinforcement effect. Further, since an excessively thick cloth loses formability, the thickness is preferably in the aforementioned range. The glass cloth may be filled beforehand with the silicone composition forming the thermally conductive adhesive layer. Alternatively, the thermally conductive adhesive layer may be attached to the glass cloth without filling the glass cloth beforehand. The latter case is preferable due to easier filling of the cloth grain via the thermally conductive adhesive layer by thermocompression bonding.

The synthetic resin film layer has a thickness of generally 2 to 30 μm or preferably 5 to 20 μm. An excessively thick synthetic resin film layer impairs the heat conductivity of the composite sheet of the present invention. Conversely, an excessively thin synthetic resin film layer may result in insufficient strength as a reinforcement layer and insufficient electrical insulation due to a deterioration in dielectric strength. Further, the synthetic resin film layer is preferably a film layer without pores that decreases dielectric strength thereof.

Examples of the synthetic resins include aromatic polyimide resins; polyamide resins; polyamide-imide resins; polyester resins such as polyethylene naphthalate; and fluoro resins such as polytetrafluoroethylene (PTFE) and tetrafluoroethylene-perfluoroalkylvinyl ether copolymer. When the aforementioned fluoro resins are used as synthetic resins, in regard to the surfaces of films used, chemical etching treatments using metal Na/naphthalene-based processing liquids are preferable to improve adhesiveness.

The aforementioned synthetic resin film preferably has a melting point of 200° C. or more to prevent reductions in mechanical strength due to thermal deformation, or is particularly preferably a heat resistant film having a melting point of 250° C. or more. An example of a heat resistant synthetic resin film having a melting point of 250° C. or more is the aromatic polyimide-based film Kapton (trademark registration in Japan) MT (product name; manufactured by DU PONT-TORAY CO., LTD.).

[Method for Preparing the Thermally Conductive Composite]

The method for preparing the thermally conductive composite comprising the thermally conductive adhesive layer and the reinforcement layer of the present invention is described in detail below. The method for preparing the thermally conductive composite of the present invention entails laminating the thermally conductive adhesive layers as outer layers onto both sides of the reinforcement layer using compression bonding at room temperature or thermocompression bonding. The method for lamination is not particularly limited and has only to be carried out as appropriate, following a conventionally known method for preparing composites.

In the case of compression bonding at room temperature, for example, the thermally conductive adhesive layer formed onto the separator film beforehand may be transferred onto both sides of the reinforcement layer. In the case of thermocompression bonding, the thermally conductive adhesive layer is similarly compression bonded and transferred using a press jig heated to a temperature of 70 to 110° C. In addition to press bonding, roll bonding and the like may be used for compression bonding. Further, the thermally conductive composite may be manufactured by diluting the thermally conductive adhesive composition with a solvent, applying the resultant to both sides of the reinforcement layer, then drying the reinforcement layer.

In the case that a glass cloth is used for the reinforcement layer, the glass cloth may be filled beforehand with the thermally conductive silicone adhesive composition. The glass cloth filled with the silicone composition is obtained by continuously applying the thermally conductive silicone adhesive composition to the glass cloth with coating equipment such as comma coaters, knife coaters, kiss coaters, and the like comprised of drying furnaces, heating furnaces, and winders, drying or evaporating the solvents, and then thermally curing for about 20 to 40 minutes at a temperature of about 130 to 170° C., preferably at about 140 to 160° C.

Alternatively, unfilled glass cloth may be filled and used to simultaneously laminate the thermally conductive adhesive layer by transferring the thermally conductive adhesive layer formed on the separator film. In this case, the thermally conductive adhesive layer is preferably transferred using a press jig heated to a temperature of 70 to 110° C. In addition to press bonding, roll bonding, and the like may be used for compression bonding. If the transfer temperature is lower than 70° C., insulation and heat conductivity may be decreased due to insufficient adhesiveness between the thermally conductive adhesive layer and the glass cloth and insufficient filling of the cloth grain. Conversely, if the transfer temperature is higher than 110° C., it may run the risk of excessively promoting the curing of the thermally conductive adhesive layer. The overall thickness of the thermally conductive composite is preferably 100 to 450 μm, further preferably 150 to 400 μm.

In any of the aforementioned preparing methods, the separator film attached to the thermally conductive composite may be peeled immediately after the transfer of the thermally conductive adhesive layer onto the reinforcement layer. However, the separator film may also stay attached to the thermally conductive composite until immediately before use in order to protect the surface thereof. After preparing the thermally conductive composite, in the case of cutting the thermally conductive composite into a desired shape, the separator film preferably stays attached.

The thermally conductive composite gives excellent adhesiveness between the members by the heat from the heat emitting element or the heat treated on mounting the composite. By arranging the thermally conductive composite between the cooling member and the heat emitting electrical component or the heat diffusion member, both is firmly fixed.

EXAMPLES

The present invention will be explained below in further detail with reference to a series of the Examples and the Comparative Examples, though the present invention is in no way limited by these Examples.

The components (a) to (f) contained in the thermally conductive adhesive layers in the following Examples and Comparative Examples are shown below.

Component (a):

(a-1) dimethylpolysiloxane raw rubber having an average degree of polymerization of 6,000;

(a-2) dimethylpolysiloxane oil having vinyl groups at both terminals of the molecule and an average degree of polymerization of 450.

Component (b):

(b-1) granular alumina having a volume average particle size of 1 μm;

(b-2) granular aluminum nitride having a volume average particle size of 1 μm;

(b-3) spherical alumina having a volume average particle size of 10 μm;

(b-4) granular aluminum nitride having a volume average particle size of 20 μm;

(b-5) spherical alumina having a volume average particle size of 45 μm.

Component (c):

(c-1) A solution of 50 mass % of silicone resin in toluene, the silicone resin having an amount of alkenyl groups bonded to D units only at 0.08 mol/100 g and an M unit to Q unit ratio of 0.9 (kinetic viscosity of 10 $mm^2/s$).

The silicone resin is represented by the following average formula, $$(R^1{}_3SiO_{1/2})_{a1}(R^1R^2SiO_{2/2})_{b1}(R^1{}_2SiO_{2/2})_{c1}(R^1SiO_{3/2})_{d1}(SiO_{4/2})_{e1}$$

wherein $R^1$ is a methyl group, $R^2$ is a vinyl group, a1 is 1.8, b1 is 1, c1 is 1, d1 is 1, e1 is 1, and a1/(d1+e1) is 0.9.

(c-2) A solution of 60 mass % of a silicone resin in toluene, the silicone resin having M/Q (molar ratio) of 1.2 and all the substituents bonded to M unit silicon atoms being methyl groups (kinetic viscosity of 8 $mm^2/s$), The silicone resin is represented by the following average formula, $$(R^1{}_3SiO_{1/2})_{a2}(R^1{}_2SiO_{2/2})_{c2}(R^1SiO_{3/2})_{d2}(SiO_{4/2})_{e2}$$

wherein all $R^1$ are a methyl group, a2 is 1.2, c2 is 0, d2 is 0, e2 is 1, and a2/e2 is 1.2.

Component (d): a cyclic organohydrogenpolysiloxane represented by the following formula.

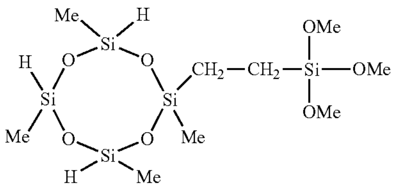 [SMILES: CO[Si](CC[Si]1(C)O[SiH](C)O[SiH](C)O[SiH](C)O1)(OC)OC]

Component (e): 2,5-dimethyl-2,5-di(t-butylperoxy) hexane.

Component (f): dimethylpolysiloxane (f-2) having a trimethoxysilyl group at one terminal of the molecule and an average degree of polymerization of 30.

The components (a), (b), (c), and (f) were placed into a Shinagawa Type Planetary Mixer in the amounts shown in Table 1 and Table 3 below and mixed for 60 minutes. Then, the components (d) and (e) were added in the amounts shown in Table 1 and Table 3 below, and an even thermally conductive silicone adhesive composition was obtained by mixing evenly.

[Forming a Thermally Conductive Adhesive Layer]

Toluene was added as appropriate to the thermally conductive silicone adhesive composition obtained above. The toluene solution was applied to a fluorinated PET film (separator film) and then heated at 80° C. to evaporate the toluene, forming a thermally conductive adhesive layer having a thickness of 150 μm. Subsequently, another separator film was joined onto the exposed side of the thermally conductive adhesive layer, and a thermally conductive adhesive layer protected by separator films on both sides was obtained. The thickness of 150 μm indicates the thickness of the thermally conductive adhesive layer alone, excluding the thickness of the separator films. The release agent used for the surface treatment of the fluorinated PET film (separator film) was X-41-3035 (manufactured by Shin-Etsu Chemical Co., Ltd.).

[Forming a Thermally Conductive Composite]

A reinforcement layer was laminated to the thermally conductive adhesive layer with the separator films obtained in the aforementioned method in the below method to form a thermally conductive composite.

Two thermally conductive adhesive layers protected by separator films on both sides were prepared. The thermally conductive adhesive layers, each with one side exposed by peeling the separator film, were thermocompression bonded onto both sides of a glass cloth (50 μm) at 90° C., and a thermally conductive composite having a glass cloth as a reinforcement layer was obtained.

Two thermally conductive adhesive layers protected by separator films on both sides were prepared. The thermally conductive adhesive layers, each with one side exposed by peeling the separator film, were thermocompression bonded onto both sides of a polyimide film (10 μm) at 90° C., and a thermally conductive composite having a polyimide film as a reinforcement layer was obtained.

In Examples 1 to 6 and Comparative Examples 1 to 6, the thermally conductive adhesive layers without the reinforcement layer (the thermally conductive adhesive layers having separator films on both sides of the adhesive composition layer) were evaluated as follows. In Examples 7 and 9 and Comparative Examples 7 and 9, the composites with a glass cloth as a reinforcement layer were evaluated as follows. In Example 8 and Comparative Example 8, the composites with a polyimide film as a reinforcement layer were evaluated as follows. The thicknesses of the thermally conductive adhesive layer and the overall thermally conductive composite are as described in Table 2 and Table 4. The size of the tapes was 200 mm by 300 mm.

[Methods for Evaluation]

(1) Handling: The adhesive layer surface of the thermally conductive adhesive layer or the thermally conductive composite was attached onto a heat diffusion member (an aluminum heat sink) and subjected to evaluation whether the desired adhesiveness was obtained or not.

The separator film of one side of the thermally conductive adhesive layer or composite was peeled and the exposed adhesive layer surface was attached to the aluminum heat sink. When the separator film on the other side was then peeled and whether the attached adhesive layer or the composite was firmly fixed to the heat sink was evaluated. In the Tables, when the attached adhesive layer or the composite was firmly fixed without slipping, the handling is evaluated as "Good". When the attached adhesive layer or the composite experienced slipping, the handling is evaluated as "Poor".

(2) Heat conductivity: The thermally conductive adhesive layer or the thermally conductive composite, with separator films on both sides peeled, was sandwiched between aluminum plates, evenly thermocompression bonded, and thermally cured in a drier at 150° C./1 hr. The heat resistance was then determined by the laser flash method. The heat conductivity was calculated from its thickness and heat resistance.

(3) Shear adhesive strength against aluminum: The thermally conductive adhesive layer or the thermally conductive composite having a thickness shown in the Tables and with separator films on both sides peeled, was sandwiched between aluminum plates with a size of 10 mm by 10 mm, evenly thermocompression bonded, and thermally cured in a dryer at 150° C./1 hr. The peel shear stress of the obtained sample was determined at room temperature using a Nordson 4000 Plus Bondtester.

(4) Dielectric breakdown voltage: The dielectric breakdown voltage of the thermally conductive adhesive layer or the thermally conductive composite, with separator films on both sides peeled, was determined according to JIS K6249: 2003.

(5) Tensile strength: The tensile strength of the thermally conductive adhesive layer or the thermally conductive composite, with separator films on both sides peeled, was determined using an Autograph according to JIS K6249: 2003.

TABLE 1

| Component, part by mass | | Example 1 | 2 | 3 | 4 | 5 | 6 | 7 | 8 | 9 |
|---|---|---|---|---|---|---|---|---|---|---|
| (a) | (a-1) | 100 | | | 100 | | | 100 | 100 | |
| | (a-2) | | 100 | 100 | | 100 | 100 | | | 100 |
| (b) | (b-1) | 600 | | 2000 | 800 | 1000 | 700 | 600 | 600 | |
| | (b-2) | | 1160 | | | | 500 | | | 1160 |
| | (b-3) | 1400 | 950 | 2200 | 1600 | 1400 | 500 | 1400 | 1400 | 950 |
| | (b-4) | | 1900 | | | | 2200 | | | 1900 |
| | (b-5) | | | 2200 | | 500 | | | | |
| Total amount of component (b) | | 2000 | 4010 | 6400 | 2400 | 2900 | 3900 | 2000 | 2000 | 4010 |
| (c) | (c-1) | 50 | 140 | 210 | 70 | 70 | 175 | 50 | 50 | 140 |
| | (c-2) | 200 | 170 | 220 | 180 | 100 | 175 | 200 | 200 | 170 |
| Total amount of component (c) | | 250 | 310 | 430 | 250 | 170 | 350 | 250 | 250 | 310 |
| Percentage of component (c-1) contained in component (c), wt % | | 20 | 45 | 49 | 28 | 41 | 50 | 20 | 20 | 45 |
| | (d) | 5 | 11 | 17 | 5 | 15 | 20 | 5 | 5 | 11 |
| | (e) | 20 | 35 | 45 | 10 | 30 | 30 | 20 | 20 | 35 |
| | (f) | 10 | 23 | 32 | 15 | 25 | 30 | 10 | 10 | 23 |

TABLE 2

| Component, part by mass | Example 1 | 2 | 3 | 4 | 5 | 6 | 7 | 8 | 9 |
|---|---|---|---|---|---|---|---|---|---|
| Reinforcement layer | None | None | None | None | None | None | Glass cloth | Polyimide | Glass cloth |
| Thickness of a tape, μm | 150 | 150 | 150 | 150 | 150 | 150 | 200 | 160 | 200 |
| Handling | Good | Good | Good | Good | Good | Good | Good | Good | Good |
| Heat conductivity, W/m · K | 2.3 | 7.0 | 4.9 | 2.8 | 3.4 | 6.5 | 1.6 | 1.4 | 5.9 |
| Shear adhesive strength against aluminum, MPa | 2.3 | 2.0 | 3.7 | 2.0 | 2.2 | 2.5 | 1.9 | 1.8 | 2.2 |
| Dielectric breakdown voltage, kV | 7.0 | 5.0 | 6.5 | 7.0 | 6.5 | 5.5 | 9.0 | 10.5 | 9.5 |
| Tensile strength, MPa | 1.0 | 0.5 | 0.8 | 1.2 | 1.5 | 0.8 | 18.0 | 15.0 | 10.0 |

TABLE 3

| Component, part by mass | | Comparative Example 1 | 2 | 3 | 4 | 5 | 6 | 7 | 8 | 9 |
|---|---|---|---|---|---|---|---|---|---|---|
| (a) | (a-1) | 100 | | | 100 | | | 100 | 100 | 100 |
| | (a-2) | | 100 | 100 | | 100 | 100 | | | |

TABLE 3-continued

| Component, part by mass | | Comparative Example 1 | 2 | 3 | 4 | 5 | 6 | 7 | 8 | 9 |
|---|---|---|---|---|---|---|---|---|---|---|
| (b) | (b-1) | 600 | | 2000 | 800 | 1000 | 700 | 600 | 600 | 600 |
| | (b-2) | | 2500 | | | | 500 | | | |
| | (b-3) | 1400 | 3000 | 2200 | 1600 | 1400 | 500 | 1400 | 1400 | 1400 |
| | (b-4) | | 3500 | | | | 2200 | | | |
| | (b-5) | | | 2200 | | 500 | | | | |
| Total amount of component (b) | | 2000 | 9000 | 6400 | 2400 | 2900 | 3900 | 2000 | 2000 | 2000 |
| (c) | (c-1) | | 140 | 20 | 350 | 70 | 175 | | | 50 |
| | (c-2) | 250 | 170 | 100 | 350 | 100 | 175 | 250 | 250 | 200 |
| Total amount of component (c) | | 250 | 310 | 120 | 700 | 170 | 350 | 250 | 250 | 250 |
| Percentage of component (c-1) contained in component (c), wt % | | 0 | 45 | 17 | 50 | 41 | 50 | 0 | 0 | 20 |
| | (d) | 5 | 11 | 17 | 5 | 50 | 20 | 5 | 5 | 0.5 |
| | (e) | 20 | 35 | 45 | 10 | 30 | 80 | 20 | 20 | 20 |
| | (f) | 10 | 40 | 32 | 15 | 25 | 30 | 10 | 10 | 10 |

TABLE 4

| Component, part by mass | Comparative Example 1 | 2 | 3 | 4 | 5 | 6 | 7 | 8 | 9 |
|---|---|---|---|---|---|---|---|---|---|
| Reinforcement layer | None | None | None | None | None | None | Glass cloth | Polyimide | Glass cloth |
| Thickness of a tape, μm | 150 | 150 | 150 | 150 | 150 | 150 | 200 | 160 | 200 |
| Handling | Good | Poor | Poor | Poor | Good | Good | Good | Good | Good |
| Heat conductivity, W/m · K | 2.3 | ND | ND | ND | 3.1 | 6.0 | 1.6 | 1.4 | 1.7 |
| Shear adhesive strength against aluminum, MPa | 0.4 | ND | ND | ND | 0.5 | 0.6 | 0.3 | 0.2 | 0.4 |
| Dielectric breakdown voltage, kV | 7.0 | ND | ND | ND | 6.0 | 5.0 | 9.0 | 10.0 | 9.0 |
| Tensile strength, MPa | 1.0 | ND | ND | ND | 0.9 | 0.4 | 17.0 | 13.0 | 18.0 |

As shown in Tables 3 and 4, Comparative Example 1 indicates a silicone composition without component (c-1), in which the adhesive strength of the thermally conductive adhesive layer was significantly decreased after being thermally cured with no pressurization. Comparative Example 2 indicates a silicone composition with more than 7,500 parts by mass of the thermally conductive filler (b), in which the obtained thermally conductive adhesive layer was brittle and handling was inadequate. Comparative Example 3 indicates a silicone composition with less than 150 parts by mass of the silicone resin (c), in which the cohesiveness of the obtained thermally conductive adhesive layer was insufficient and handling was inadequate. Comparative Example 4 indicates a silicone composition with more than 600 parts by mass of the silicone resin (c), in which the obtained thermally conductive adhesive layer was brittle and handling was inadequate. Comparative Example 5 indicates a silicone composition with more than 25 parts by mass of the organohydrogenpolysiloxane (d), in which the adhesive strength of the thermally conductive adhesive layer was decreased compared to Example 5. Comparative Example 6 indicates a silicone composition with more than 50 parts by mass of the organic peroxide (e), in which the adhesive strength of the thermally conductive adhesive layer was decreased compared to Example 6. Comparative Example 7 indicates a composite of the thermally conductive adhesive layer of Comparative Example 1 and a glass cloth, and Comparative Example 8 indicates a composite of the thermally conductive adhesive layer of Comparative Example 1 and a polyimide film. In both composites, adhesive strength was significantly decreased after thermal curing. Comparative Example 9 indicates a silicone composition with less than 1 part by mass of the organohydrogenpolysiloxane (d), in which the wettability of the obtained thermally conductive adhesive layer onto the adherends was decreased, thereby reducing adhesive strength.

In contrast, as shown in Tables 1 and 2, the thermally conductive adhesive layer obtained by forming the thermally conductive silicone adhesive composition of the present invention into a thin film and the thermally conductive composite having the adhesive layer have excellent handling and heat conductivity and is easily mounted onto the adherends. Further, the curing of the adhesive layer proceeded without pressurization during the thermal curing, and excellent adhesive strength is expressed under simple curing conditions.

INDUSTRIAL APPLICABILITY

The thermally conductive silicone adhesive composition of the present invention has excellent handling and is easily mounted onto the heat diffusion member. Furthermore, the thermally conductive silicone adhesive composition imparts desirable heat conductivity between the heat emitting element and the heat diffusion member, and expressing excellent adhesive strength and thereby the members is firmly fixed together. Further, the thermally conductive silicone adhesive composition does not require a curing process at a high pressure for thermocompression bonding (joining) with the heat diffusion member. Instead, the thermally conductive silicone adhesive composition is cured by leaving it at a high temperature for a predetermined time and a cured product with sufficient adhesive strength is obtained, thereby allowing the thermally conductive silicone adhesive composition of the present invention to be used to join a wide range of heat diffusion members.

The invention claimed is:

1. A thermally conductive silicone adhesive composition, comprising the following components (a) to (e):

(a) 100 parts by mass of a linear or branched organopolysiloxane;

(b) 1,500 to 7,500 parts by mass of a thermally conductive filler;

(c) 150 to 600 parts by mass of an organopolysiloxane resin with three-dimensional network structure, comprising the following components (c-1) and (c-2);

(c-1) an organopolysiloxane resin with three-dimensional network structure, represented by the following general formula (1):

$$(R^1_3SiO_{1/2})_{a1}(R^1R^2SiO_{2/2})_{b1}(R^1_2SiO_{2/2})_{c1}(R^1SiO_{3/2})_{d1}(SiO_{4/2})_{e1} \quad (1)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, $R^2$ is an alkenyl group having 2 to 8 carbon atoms, and a1, b1, c1, d1 and e1 are numbers each satisfying equations $0<a1<=100$, $0<b1<=100$, $0<=c1<=100$, $0<=d1<=100$, $0<=e1<=100$, $0<d1+e1$, and $0.5<=a1/(d1+e1)<=2$, wherein an amount of alkenyl groups in the molecule is 0.05 to 0.15 mol/100 g;

(c-2) an organopolysiloxane with three-dimensional network structure resin, represented by the following general formula (2):

$$(R^1_3SiO_{1/2})_{a2}(R^1_2SiO_{2/2})_{c2}(R^1SiO_{3/2})_{d2}(SiO_{4/2})_{e2} \quad (2)$$

wherein $R^1$ is, independently of each other, a group selected from the group consisting of alkyl groups having 1 to 10 carbon atoms, aryl groups having 6 to 10 carbon atoms, and aralkyl groups having 7 to 10 carbon atoms, and a2, c2, d2 and e2 are numbers each satisfying equations $0<a2<=100$, $0<=c2<=100$, $0<=d2<=100$, $0<e2<=100$, and $0.7<=a2/e2<=2.5$;

(d) 1 to 25 parts by mass of an organohydrogenpolysiloxane having two or more hydrosilyl groups in one molecule; and (e) 5 to 50 parts by mass of an organic peroxide.

2. The thermally conductive silicone adhesive composition according to claim 1, wherein an amount of component (c-1) is 10 to 60 mass %, based on a total amount of component (c).

3. The thermally conductive silicone adhesive composition according to claim 2, wherein component (a) has an average degree of polymerization of 100 to 20,000.

4. The thermally conductive silicone adhesive composition according to claim 3, wherein component (a) has two or more alkenyl groups in one molecule and an average degree of polymerization of 100 to 20,000.

5. The thermally conductive silicone adhesive composition according to claim 2, wherein component (a) has two or more alkenyl groups in one molecule and an average degree of polymerization of 100 to 20,000.

6. The thermally conductive silicone adhesive composition according to claim 2, wherein component (b) is one or more selected from the group consisting of metals, metal oxides and metal nitrides.

7. The thermally conductive silicone adhesive composition according to claim 2, further comprising 1 to 50 parts by mass of (f) one or more components selected from the following components (f-1) and (f-2):

(f-1) an alkoxysilane compound represented by the following general formula (3):

$$R^3_mR^4_nSi(OR^5)_{4-m-n} \quad (3)$$

wherein $R^3$ is, independently of each other, an alkyl group having 6 to 15 carbon atoms, $R^4$ is, independently of each other, an alkyl group having 1 to 5 carbon atoms, $R^5$ is, independently of each other, an alkyl group having 1 to 6 carbon atoms, m is an integer of 1 to 3, and n is an integer of 0 to 2, provided that m+n is an integer of 1 to 3;

(f-2) a dimethylpolysiloxane represented by the following general formula (4):

(4)

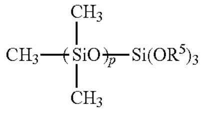

wherein $R^5$ is, independently of each other, an alkyl group having 1 to 6 carbon atoms, and p is an integer of 5 to 100.

8. The thermally conductive silicone adhesive composition according to claim 1, wherein component (a) has an average degree of polymerization of 100 to 20,000.

9. The thermally conductive silicone adhesive composition according to claim 8, wherein component (a) has two or more alkenyl groups in one molecule and an average degree of polymerization of 100 to 20,000.

10. The thermally conductive silicone adhesive composition according to claim 8, wherein component (b) is one or more selected from the group consisting of metals, metal oxides and metal nitrides.

11. The thermally conductive silicone adhesive composition according to claim 1, wherein component (a) has two or more alkenyl groups in one molecule and an average degree of polymerization of 100 to 20,000.

12. The thermally conductive silicone adhesive composition according to claim 11, wherein component (b) is one or more selected from the group consisting of metals, metal oxides and metal nitrides.

13. The thermally conductive silicone adhesive composition according to claim 1, wherein component (b) is one or more selected from the group consisting of metals, metal oxides and metal nitrides.

14. The thermally conductive silicone adhesive composition according to claim 1, further comprising 1 to 50 parts by mass of (f) one or more components selected from the following components (f-1) and (f-2):

(f-1) an alkoxysilane compound represented by the following general formula (3):

$$R^3_m R^4_n Si(OR^5)_{4-m-n} \quad (3)$$

wherein $R^3$ is, independently of each other, an alkyl group having 6 to 15 carbon atoms, $R^4$ is, independently of each other, an alkyl group having 1 to 5 carbon atoms, $R^5$ is, independently of each other, an alkyl group having 1 to 6 carbon atoms, m is an integer of 1 to 3, and n is an integer of 0 to 2, provided that m+n is an integer of 1 to 3;

(f-2) a dimethylpolysiloxane represented by the following general formula (4):

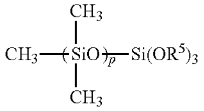

(4)

wherein $R^5$ is, independently of each other, an alkyl group having 1 to 6 carbon atoms, and p is an integer of 5 to 100.

15. A thermally conductive composite comprising a first thermally conductive adhesive layer laminating on one surface of a reinforcement layer and a second thermally conductive adhesive layer laminating on another surface of the reinforcement layer, wherein the first and second thermally conductive adhesive layers, independently of each other, consist of the thermally conductive silicone adhesive composition according to claim 1.

16. The thermally conductive composite according to claim 15, wherein the thermally conductive adhesive layer has a heat conductivity of 2.0 W/mK or more.

17. The thermally conductive composite according to claim 15, wherein the reinforcement layer is composed of a synthetic resin or is a glass cloth.

18. The thermally conductive composite according to claim 17, wherein the synthetic resin is one or more selected from the group consisting of aromatic polyimide resins, polyamide resins, polyamide-imide resins, polyester resins and fluoro resins.

19. The thermally conductive composite according to claim 15, further comprising a substrate having a surface-treated with a release agent, wherein the surface treated with the release agent of the substrate is joined to the surface of at least one of the first and second thermally conductive adhesive layers in which the surface is not laminated to the reinforcement layer.

20. The thermally conductive composite according to claim 19, wherein the release agent is a fluorine-modified silicone having a fluorine-containing substituent bonded to the main chain.

* * * * *